Nov. 1, 1955　　　F. A. CABELL　　　2,722,134
HYDRAULIC DIFFERENTIAL CONTROL MECHANISM
Filed May 28, 1952　　　4 Sheets-Sheet 1

Foraker A. Cabell
INVENTOR.

BY *Clarence A. O'Brien and Harvey B. Jacobson*
Attorneys

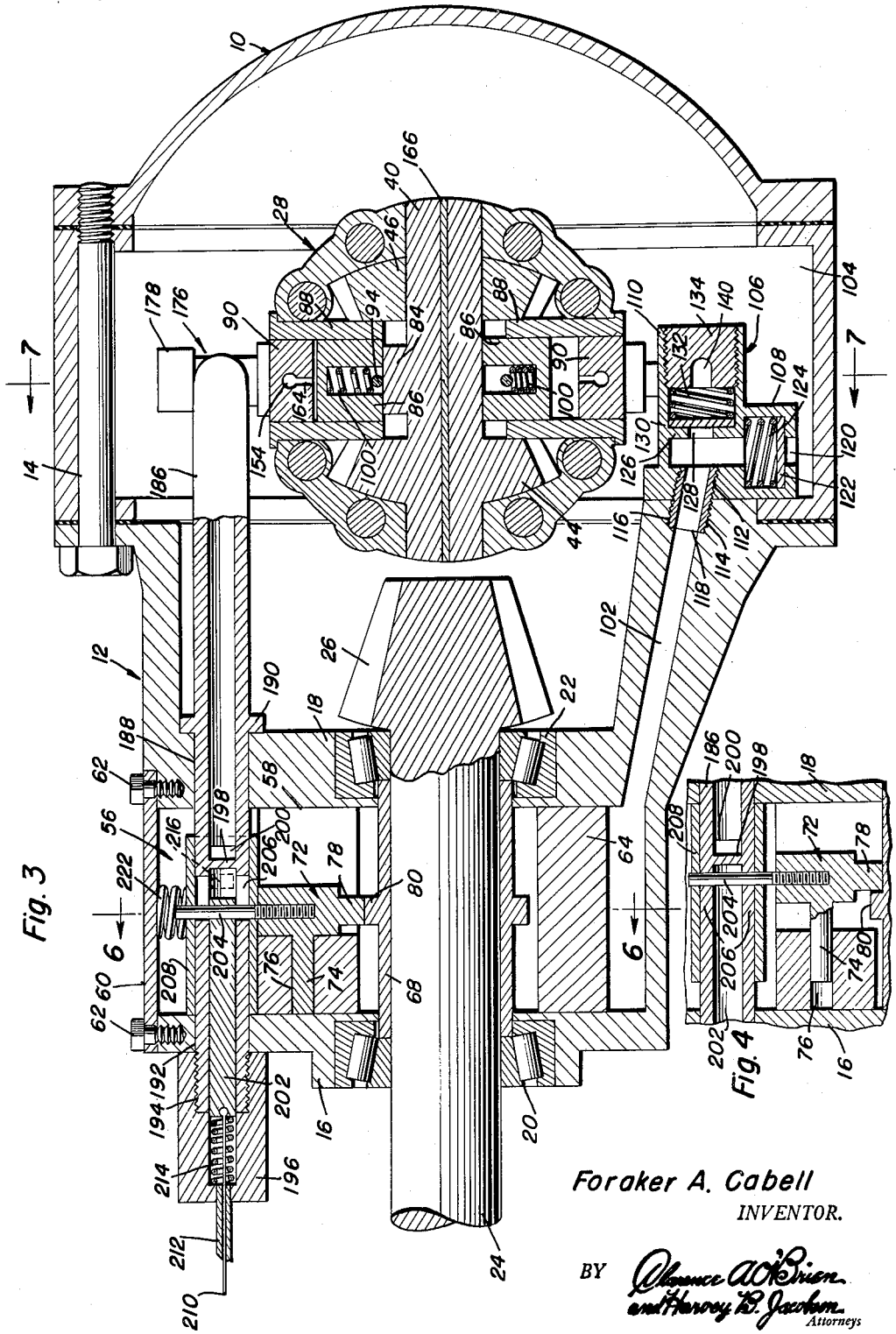

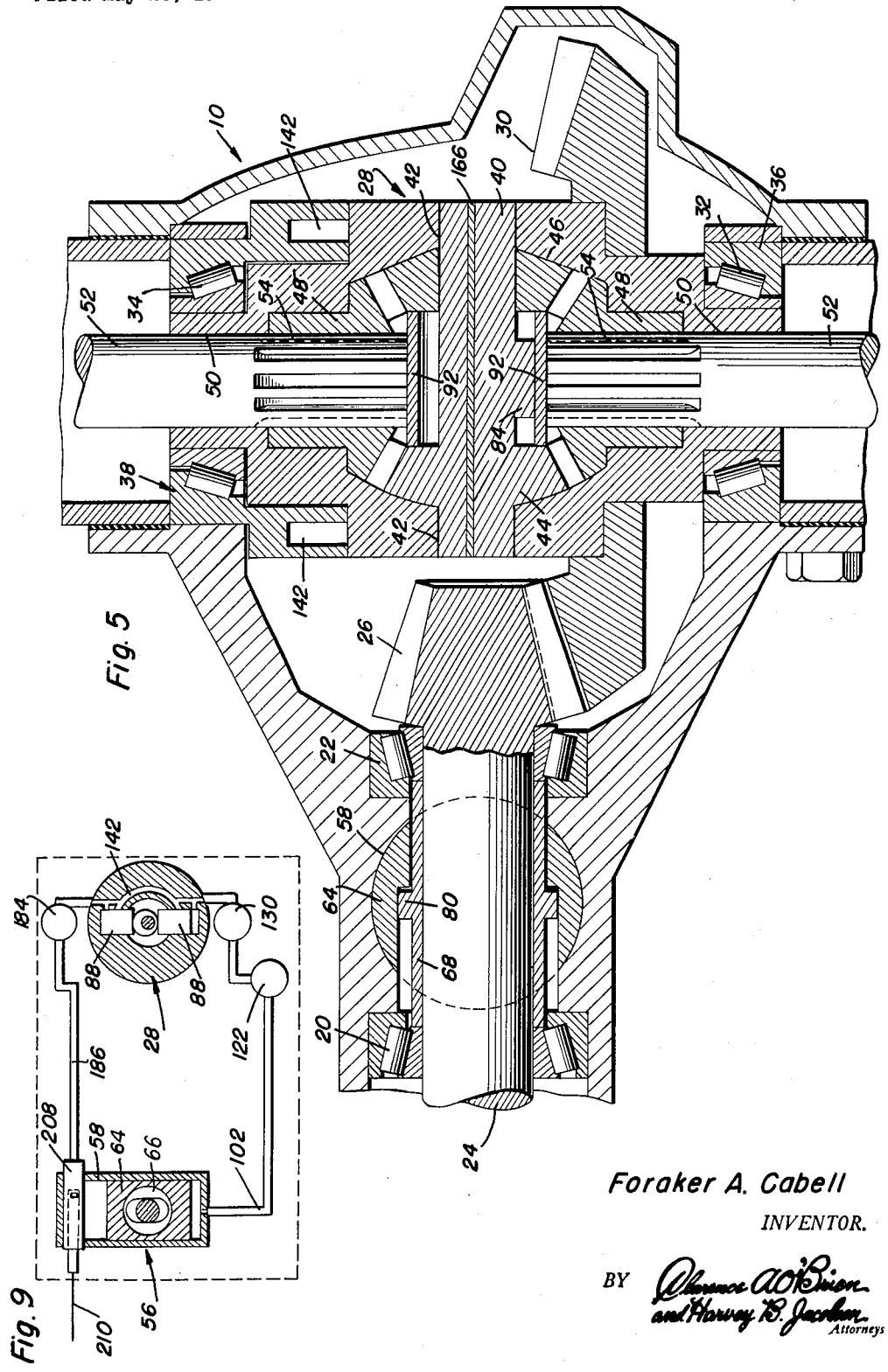

Nov. 1, 1955  F. A. CABELL  2,722,134
HYDRAULIC DIFFERENTIAL CONTROL MECHANISM
Filed May 28, 1952  4 Sheets-Sheet 4
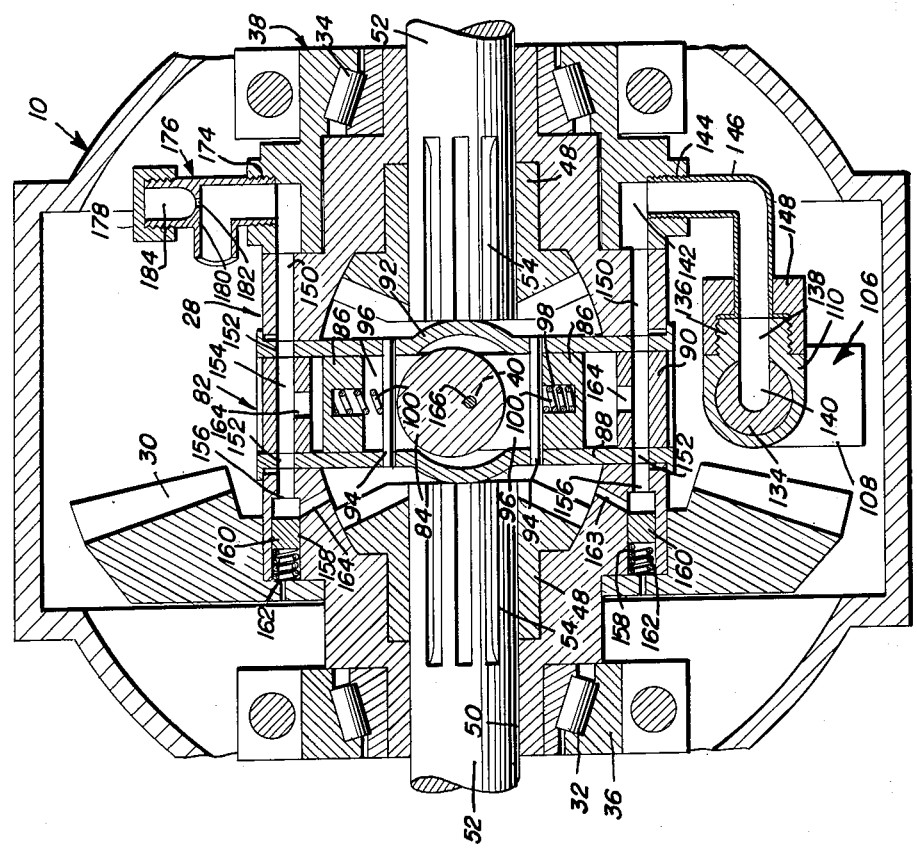
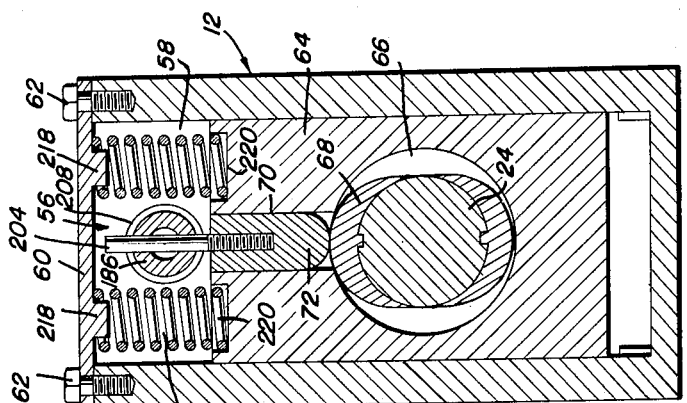
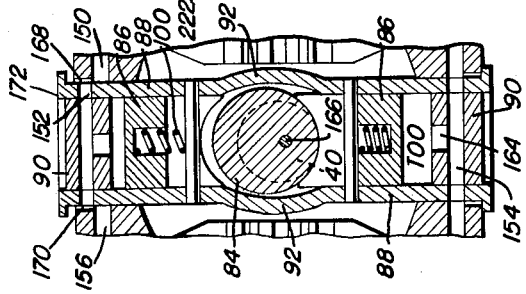
Foraker A. Cabell
INVENTOR.

United States Patent Office 2,722,134
Patented Nov. 1, 1955

2,722,134
HYDRAULIC DIFFERENTIAL CONTROL MECHANISM

Foraker A. Cabell, Nashville, Tenn.

Application May 28, 1952, Serial No. 290,552

16 Claims. (Cl. 74—472)

This invention relates to improvements in the conventional vehicle differential. This conventional differential consists substantially of an arrangement of gear wheels, forming an epicyclic gear train which connects to rear axles in the same straight line so as to act as an ordinary coupling under normal conditions. However, this coupling is able to divide driving forces equally between the axles and at the same time permit one axle to revolve faster than the other axle, and to allow driven wheels associated with the axles to make equal use of an idling motor's retarding force. In performing these necessary functions the conventional differential may, under slippery road conditions, actually become an important factor in preventing a motor of a vehicle for moving the same along a road. Slippery road conditions cause conventional differentials to allow a driven wheel obtaining the smaller amount of traction of the two wheels with respect to the road to slip over the road surface while the driven wheel obtaining the greater amount of traction remains relatively stationary, and thus makes an ineffectual contribution towards movement of the vehicle over the road. It is, therefore, logical to assume that a very potent forward or backward thrust could be imparted to a vehicle if a practical way were found for selectively coupling, at the will of an operator of the vehicle, the slipping wheel with the relatively stationary wheel, and for automatically uncoupling these wheels as the need arises.

The primary object of this invention is to provide a hydraulic differential control mechanism for permitting regulated differential action of a rear axle differential assembly as well as unregulated differential action thereof.

Another object of this invention is to provide means for permitting regulated differential action of the rear axle differential assembly at the will of the vehicle's operator as well as an unregulated differential action.

Another object of this invention is to provide an improved rear axle differential assembly which is provided with a hydraulic differential control mechanism, said control mechanism being capable of automatically, as the need arises, to change the action of the rear axle differential assembly from unregulated differential action to regulated differential action; or from regulated differential action to unregulated differential action.

Another object of this invention is to provide an improved hydraulic differential control mechanism for selectively eliminating differential action of a rear axle differential assembly whereby a more efficient drive unit for a vehicle may be realized, said modified rear axle differential assembly utilizing many parts of conventional differential units to effect a maximum economy and manufacture.

A further object of this invention is to provide an improved hydraulic differential control mechanism for rear axle differential assemblies, said control mechanism adapted to regulate the differential action of the differential assembly automatically whenever an operator of a vehicle so equipped actuates an accelerator pedal of the vehicle.

A still further object of this invention is to provide an improved hydraulic differential control mechanism for a rear axle differential assembly, said control mechanism being provided with facilities for continuously and automatically averting strain to parts thereof which would result from sudden failure of a vehicle's tire on a driven wheel, or the imposition of any operating condition on the vehicle which would place practically all of its motor's torque on one general wheel, while the control mechanism was in the act of regulating differential action thereof.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application and in which:

Figure 3 is an enlarged longitudinal vertical sectional view taken through the rear axle assembly illustrated in Figure 1 and shows the general construction thereof, a differential carrier thereof being provided with an actuating pump assembly, said actuating pump assembly being illustrated in an operative position;

Figure 4 is a fragmentary longitudinal vertical sectional view similar to Figure 3 and shows the means for moving a piston of the actuating pump assembly from an operative position to an inoperative position, said means being in an inoperative position;

Figure 5 is an enlarged fragmentary longitudinal horizontal sectional view taken through the center of the rear axle assembly of Figure 1 and shows the general construction of the interior thereof including the interior of a differential assembly;

Figure 6 is a transverse vertical sectional view taken substantially upon the plane indicated by the section line 6—6 of Figure 3 and shows the general construction of the actuating pump assembly;

Figure 7 is a transverse vertical sectional view taken substantially upon the plane indicated by the section line 7—7 of Figure 3 and shows the general construction of a differential pump assembly mounted within a differential gear case and operatively connected to the actuating pump assembly of the differential carrier;

Figure 8 is a fragmentary transverse vertical sectional view similar to Figure 7 and shows the relationship of of cylinders of the differential pump assembly in expanded positions; and Figure 9 is a schematic diagram showing the arrangement of fluid passages for connecting said differential pump assembly to the actuating pump assembly.

Similar characters of reference designate similar or identical elements and portions throughout the specification and throughout the different views of the drawings.

Figure 1:
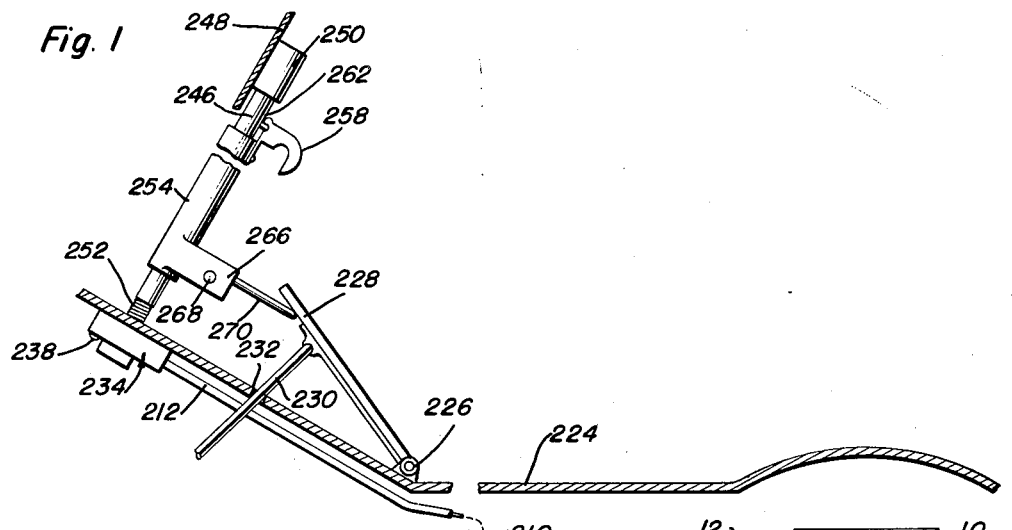
Figure 1 is a schematic side elevational view of a floor portion of a vehicle in which a rear axle differential assembly of the vehicle is equipped with the hydraulic differential control mechanism which is the subject of this invention, also shown is the means associated with an accelerator pedal of the vehicle for actuating the control mechanism.

Referring now to the drawings in detail, it will be seen that there is illustrated a rear axle assembly for a conventional vehicle, said rear axle assembly including a rear axle gear case, which is referred to in general by the reference numeral 10. The rear axle gear case 10 includes a differential carrier housing 12 mounted at the forward end thereof and secured thereto by a plurality of bolts 14. The differential carrier 12 includes a pair of longitudinally spaced transversely extending portions 16 and 18 in which are mounted front and rear drive pinion shaft bearings 20 and 22, respectively. Mounted within the bearings 20 and 22 for rotation is a drive pinion shaft 24, the drive pinion shaft 24 being adapted to be connected to a motor (not shown) of a vehicle and rotated thereby. The rear end of the drive pinion shaft 24 has integral therewith a drive pinion 26.

Referring now to Figure 5 in particular, it will be seen that mounted within the rear axle gear case 10 is a conventional differential gear case 28 which has secured thereto a ring gear 30, the ring gear being in engagement with the pinion 26 and driven by the same. It will be understood that the differential gear case 28 is of a conventional construction and includes a pair of halves, not shown in detail, which are secured together by fasteners (not shown), and that the means securing together the halves of the differential gear case 28 may secure the ring gear 30 thereto if the same is formed separate of the associated half of the differential gear case 28.

The differential gear case 28 and the associated ring gear 30 are mounted within the rear axle gear case 10 for rotation and are supported by bearings on opposite sides thereof. It will be understood that the bearings include a first bearing assembly 32 which is carried at the left side of the rear axle gear case 10, as viewed in Figure 5, by a differential bearing cup 36 secured to the rear axle gear case 10, in any conventional manner. The right side of the differential gear case 28 is supported by a bearing assembly 34 which includes a special differential bearing cup 38, the differential bearing cup 38 being supported by the right side of the rear axle gear case 10.

Mounted within the differential gear case 28 is a differential pinion shaft 40 which is shown as substantially in alignment with the drive pinion shaft 24. The differential pinion shaft 40 is journaled within bores 42 in the ends of the differential gear case 28 for rotation with respect to the same and has formed integrally with a forward end portion thereof a first differential pinion 44. Mounted on the differential pinion shaft 40 adjacent the rear bore 42 is a second differential pinion 46, the differential pinion 46 being free to rotate with respect to the differential pinion shaft 40. Also mounted within the differential gear case 28 for rotation therewithin are a pair of side gears 48 which are in engagement with the differential pinions 44 and 46 and are adapted to drive the same. The differential gear case 28 is provided with a pair of opposed longitudinally extending bores 50 in which are mounted axles 52, the inner ends of the axles 52 being provided with splined connections 54 with their respective side gears or axle pinions 48.

It will be understood that during the normal operation of the rear axle assembly rotative force is transmitted to the drive pinion shaft 24 with the resultant rotation of the drive pinion 26. Inasmuch as the ring gear 30 is in engagement with the drive pinion 26, the same is also rotated and results in the rotation of the differential gear case 28 to which it is attached. During the normal operation of a vehicle, the differential gear case 28 and its associated gears and the axles 52 rotate as a unit. However, when wheels (not shown) attach to the axles 52 go around a curve or one of the wheels slip, one of the axles 52 turns faster than the other axle 52 whereby a direct connection between the axles 52 no longer exists. The relative rotation of one of the axles 52 with respect to the other axle results in the rotation of the side gears 48 and the associated pinions 44 and 46. This particular action is well-known as a differential action, and while it is desirable in the case of driving vehicles around curves, having tire blow-outs, etc., it will be seen that it has a disadvantage in that a car may be easily stuck in that slippage of one wheel only prevents the driving of the vehicle. It is, therefore, desired to provide means for selectively locking the differential pinions 44 and 46 against rotation whereby the differential action may be controlled, and in order to perform this function there has been provided the hydraulic differential control mechanism, which is the subject of this invention.

Referring now to Figures 3 and 5 in particular, it will be seen that formed between the transversely extending portions 16 and 18 of the differential carrier 12 is an actuating pump assembly, which is referred to in general by the reference numeral 56. The actuating pump assembly 56 includes a vertically extending cylinder 58 formed in the casting which is the major portion of the differential carrier 12, the cylinder 58 being positioned between the transversely extending portions 16 and 18 and opening through the upper surface of the differential carrier 12. The upper end of the cylinder 58 is closed by a cover plate 60 which is secured to the differential carrier 12 by a plurality of fasteners 62, the closure plate 60 being flush with the upper surface of the differential carrier 12.

Mounted within the cylinder 58 for vertical reciprocation is a solid piston 64. The piston 64 has an enlarged opening 66 extending longitudinally therethrough and receiving the drive pinion shaft 24, and that portion of the drive pinion shaft 24 disposed within the piston 64 is provided with a combination bearing spacer and cam wheel 68, the ends of the combination bearing spacer and cam wheel 68 engaging the bearing assemblies 20 and 22 and being positioned thereby.

It will be noted that the upper portion of the piston 64 is provided with a longitudinally extending rectangular cross-sectional slot 70 which communicates with the opening 66 and extends through the upper end of the piston. Mounted within the slot 70 for longitudinal movement therein is a T-shaped member 72 which has a stem portion 74 extending horizontally. The stem 74 is slidably mounted within a longitudinal bore 76 in that portion of the piston at the forward end of the slot. The T-shaped member 72 has a lower portion 78 which is adapted to engage the cam portion 80 of the combination bearing spacer and cam wheel 68 whereby the piston 64 may be reciprocated in response to rotation of the drive pinion shaft 24. It will be noted that the cam 80 of the bearing spacer and cam wheel 68 is of a nature whereby the piston 64 is reciprocated two complete strokes for each revolution of the drive pinion shaft 24. It will be understood that the T-shaped member may be selectively moved into or out of engagement with the cam 80 by control means which will be explained in more detail hereinafter, whereby the actuating pump assembly 56 may be selectively controlled by an operator of a vehicle to which the same is attached. Referring now to Figures 3 and 7 in particular, it will be seen that the differential gear case 28 has extending vertically through the central portion thereof a differential pump assembly, which is referred to in general by the reference numeral 82. The differential pump assembly 82 includes a cam 84 mounted on the differential pinion shaft 40, said cam 84 being adapted to engage inner ends of pistons 86 for reciprocating the same. The pistons 86 are mounted within cylinders 88 having cylinder heads 90 in the outer ends thereof. The cylinders 88 are connected at their inner ends by a generally circular cross sectional cam race 92 which is formed of an elastic steel. Extending transversely across the inner ends of the cylinders 88 are pins 94 which are received in transverse slots 96 in the lower ends of the pistons 86. The pistons 86 are also provided with longitudinally extending circular bores 98 in which are received coil springs 100 engaging the transverse pins 94 and urging the pistons 86 outwardly from the cam 84 and out of engagement therewith.

Referring now to Figure 3 in particular, it is seen that the differential carrier 12 is provided with a rearwardly extending fluid passage 102 which communicates with the lower end of the cylinder 58 and provides both an inlet and outlet for the same. Carried by the rear end of the differential carrier 12 and disposed in a sump portion 104 of the differential rear axle case 10 is a valve assembly, which is referred to in general by the reference numeral 106. It will be noted that the valve assembly includes a first tubular portion 108 which is connected at right angles to a second tubular portion 110 to form an L-shaped member. One wall of the tubular portion 108 is of a relatively great thickness and is provided with an internally threaded bore 112. The bore 112 is aligned with the fluid passage 102 and an enlarged outer end thereof which is internally threaded as at 114. Threadedly engaged with the internally threaded bore 112 and the internally threaded portion 114 is an externally threaded connecting member 116 having a bore 118 therethrough which communicates the fluid passage 102 with the interior of the tubular portion 108. The valve assembly 106 is connected to the transversely extending portion 18 of the differential carrier 12 by the connecting member 116 through the screwing of the connecting member 116 into these parts through the use of a suitable tool (not shown) past through the valve assembly 106 when parts thereof to be described in detail hereinafter have been removed. It will be understood that if desired, one end of the connecting member 116 may be provided with a suitable tool engaging notch to facilitate such operation.

The lower end of the tubular portion 108 of the valve assembly 106 is provided with an inlet opening 120 through which gear oil disposed within the rear axle case 10 for lubricating the gears mounted therein is adapted to enter. The inlet opening 120 in the tubular portion 108 is normally closed by a check valve 122 which is urged to a closed position by a coil spring 124. It will be understood that upon upward motion of the piston 64 oil will be drawn through the inlet opening 120 into the tubular portion 108 and the fluid passage 102.

It will be noted that the forward end of the tubular portion 110 is provided with a transverse wall 126, the transverse wall 126 being disposed within the tubular portion 108. The transverse wall 126 is provided with an outlet opening 128 which is normally closed by a pressure regulating valve 130. The pressure regulating valve 130 is urged to a closed position by a coil spring 132 mounted within the tubular portion 110 and adjustably tensioned by a plug 134 adjustably threadedly engaged in the rear end thereof. It will be understood that as the piston 64 makes a downward stroke, oil disposed within the fluid passage 102 and the upper part of the tubular portion 108 is urged through the outlet opening 128 and opens the pressure control valve 130.

Referring now to Figure 7 in particular, it is seen that the tubular portion 110 is in reality L-shaped and includes an externally threaded portion 136 which extends at right angles to the main portion thereof. The externally threaded portion 136 is provided with a fluid passage 138 therethrough which communicates with a fluid passage 140 in the plug 134 through which fluid pumped by the actuating pump assembly 56 passes.

The differential bearing cup 38 includes a fluid well 142 which is in the form of a circular fluid passage opening through the inner side of the differential bearing cup. It will be understood that the differential bearing cup 38 is rigidly connected to the differential carrier 12 and does not rotate with the differential bearing case 28. The lower end of the differential bearing cup 38 is provided with an internally threaded bore 144 which communicates with the fluid well 142 and has threadedly engaged therein one end of a connecting tube 146. The other end of the connecting tube 146 is flared and connected to the externally threaded projecting portion 136 of the valve assembly 106 by a coupling 148 threadedly engaged thereon. It will be understood that oil pumped by the actuating pump assembly 56 enters the fluid well 142 under pressure.

The half of the differential gear case 28 in abutting relation with the differential bearing cup 38 is provided with a pair of longitudinally extending fluid passages 150 which are in alignment with the fluid well 142 and have oil under pressure applied thereto from the fluid well. The cylinders 88 are provided with aligned openings 152 and the cylinder heads 90 are provided with aligned bores 154 whereby oil may be pumped therethrough. The other half of the differential gear case 28 is provided with a bore 156 which is in alignment with the bores and openings 150, 152 and 154 whereby the same is provided with oil under pressure. In order that oil pumped by the actuating pump assembly 56 may escape in small amounts, the outer ends of the bores 156 are enlarged as at 158 and have mounted therein pressure actuated valves 160 which are urged to closed positions by coil springs 162. The enlarged portions 158 of the bores 156 are communicated to the interior of the differential gear case 28 by vent passages 164. It will be understood that the fluid actuated valves 160 normally close the vent passages 163 and are opened by oil pressure from the actuating pump assembly 56.

It will be noted that the cylinder heads 90 are provided with longitudinal bores 164 which communicate the interiors of their respective cylinders 88 with the bores 154 whereby oil may be pumped into the cylinders 88 by the actuating pump assembly 56. The pressure exerted upon the pistons 86 forces the same inwardly into engagement with the cam 84 and against the outward force of the coil springs 100. It will be noted that the differential pinion shaft 40 is provided with a heavy metal core 166 in offset relation of the single cam 84. As the vehicle, in which the rear axle assembly described hereinabove is assembled, travels along a road at low speed and makes a turn or has one wheel thereof in slipping engagement with the road whereby one of the axles 52 has a tendency to turn with respect to the other, the rotation of the differential pinion 44, which is integral with differential pinion shaft 40 is resisted due to the relative immobility of the pistons 86. Inasmuch as the pistons 86 are prevented from reciprocating, the cam 84 is prevented from rotating and likewise the differential pinion shaft 40 is also prevented from rotating. It will, therefore, be seen that when the actuating pump assembly 56 is engaged that the differential action between the axles 52 has been prevented and that the two axles are substantially connected together as a unit.

It is recognized that when the hydraulic differential control mechanism, which is the subject of this invention, operates to lock the axles 52 together as a driving unit, that there are certain vehicular operating conditions which might suddenly place the entire torque of the vehicle's motor on one of the driven wheels and its associated axle 52. Such an operating condition might occur when, due to road conditions, one driven wheel becomes, momentarily and for an appreciable length of time, free of the road's surface. Another operating position which might place the entire torque of the vehicle's motor on one driven wheel would occur in the event of a sudden tire failure, such as a blow-out. If either of the above-mentioned operating conditions occurred while the hydraulic differential control mechanism was in the act of regulating differential action, there would be, of course, a sudden increase of differential motion that would precede a greater rate of speed than could be permitted by the differential control mechanism. Since this increased differential motion would have to occur if the vehicle were operated safety, such motion would tear asunder the differential pump assembly and thereby permanently ruin the vital parts of the vehicle's rear axle assembly. If the differential pump assembly, which is referred to in general by the reference numeral 82, were not torn asunder, the vehicle could not be operated safely.

It will be noted that in the description of the generally circular cam race 92 which connects together the cylinders 88 that the same was described as being formed of a spring steel. When the differential action results in the sudden rotation of the differential pinion shaft 40, the pistons 86 will be rapidly reciprocated with the result that fluid could not be pumped out of the bores 164 sufficiently fast to permit outward movement of the pistons 86. Therefore, there woud be a tendency to either force the cylinder heads 90 out of their respective cylinders 88 or to tear apart the differential gear mechanism. However, since the cam race 92 is formed of an elastic steel, the cylinder heads 90 are urged apart with the resultant movement of the associated cylinders 88 away from each other and the flattening of the generally curved cam race 92 to an elliptical shape, such as illustrated in Figure 8. It will be noted that the bores 150 and 156 of the halves of the differential gear case 28 are provided with outwardly open bores 168 and 170, respectively. When the cylinders 88 are in their normal positions, annular flanges 172 on the outer ends thereof are in engagement with the outer surface of the differential gear case 28 and close the openings 168 and 170. When the cylinders 88 are in their outwardly urged positions, the openings 152 therethrough are aligned with the openings 168 and 170 whereby oil pumped by the pistons 86 is permitted to escape into the rear axle case 10 along with oil pumped by the actuating pump assembly 56.

Referring now to Figure 7 in particular, it will be seen that the upper end of the differential bearing cup 38 is provided with an internally threaded bore 174 in which is threadedly engaged one end of one arm of the T-shaped fitting 176. The other arm of T-shaped fitting 176 is externally threaded and provided with a closure cap 178. It will be noted that the arm that is closed by the closure cap 178 is partially closed from the remaining portion of the T-shaped fitting 176 by a transverse wall 180 having a small opening 182 therethrough. It is intended that the said other arm form an air dome 184 in which air is adapted to be disposed and compressed by fluid pumped by the actuating pump assembly 56 and passing through the T-shaped fitting 176. The purpose of the air dome 184 is to maintain a steady pressure within the fluid well 142 in spite of the pulsation movement of the actuating pump assembly 56.

Referring now to Figure 3 in particular, it will be seen that connected to the stem of the T-shaped fitting 176 is a pressure regulating pipe 186 for instantaneously disengaging the differential pump assembly 82 from the actuating pump assembly 56. The forward end of the pressure regulating pipe 186 passes through a bore 188 in the transverse portion 18 of the differential carrier 12 and is positioned with respect thereto by an intermediate annular shoulder 190 which engages the rear surface of the transverse portion 18. The extreme forward end of the pressure regulating pipe 186 passes through a bore 192 in the transverse portion 16 and is provided with an externally threaded end portion 194. Threadedly engaged on the end portion 194 is a connecting member 196 which retains the pressure regulating pipe 186 in place. That portion of the pressure regulating pipe 186 disposed within the cylinder 58 of the actuating pump assembly 56 is provided with a transverse bulkhead 198 closing the end thereof and preventing flow of fluid through the remaining portion of the pressure regulating pipe. The side wall of the pressure regulating pipe 186 is provided with a fluid outlet opening 200 adjacent the bulkhead 198 through which oil may escape.

Carried by the portion of the pressure regulating pipe 186 forward of the bulkhead 198 is a rod 202 which has secured to a rear end portion thereof a vertically extending pin 204. The vertically extending pin 204 extends through longitudinally extending slots 206 in the pressure regulating pipe 186 and is connected to a valve sleeve 208 slidably mounted on the forward end of the pressure regulating pipe 186. The lower end of the vertical pin 204 is threadedly engaged in the T-shaped member 72 and is utilized for moving the same longitudinally with respect to the drive pinion shaft 24.

Connected to the forward end of the rod 202 is a flexible cable 210 which is mounted in a flexible housing 212, the flexible housing 212 being secured to the forward end of the connecting member 196. Disposed within the connecting member 196 is a coil spring 214 which engages the forward end of the rod 202 and urges the same rearwardly to a position whereby the rear end thereof engages the bulkhead 198. It will be understood that when the rod 202 is in its rearmost position, the T-shaped member 72 is out of engagement with the cam 80 and the actuating pump assembly 56 is not operatively connected to the drive pinion shaft 24. At this time a rectangular opening 216 in the sleeve 208 is aligned with the outlet opening 200 to permit oil within the pressure regulating pipe 186 to escape.

As is best illustrated in Figure 6, the closure plate 60 of the cylinder 58 is provided with a pair of downwardly extending projections 218 which are disposed on opposite sides of the pressure regulating pipe 186 and in alignment with circular recesses 220 in the upper surface of the piston 64. Extending between the piston 64 and the closure plate 60 is a pair of coil springs 222 whose upper ends are disposed around the projections 218 and whose lower ends are disposed within the recesses 220. It will be understood that the coil springs 222 urge the piston 64 downwardly against the upward movement of the cam 68.

Figure 2:
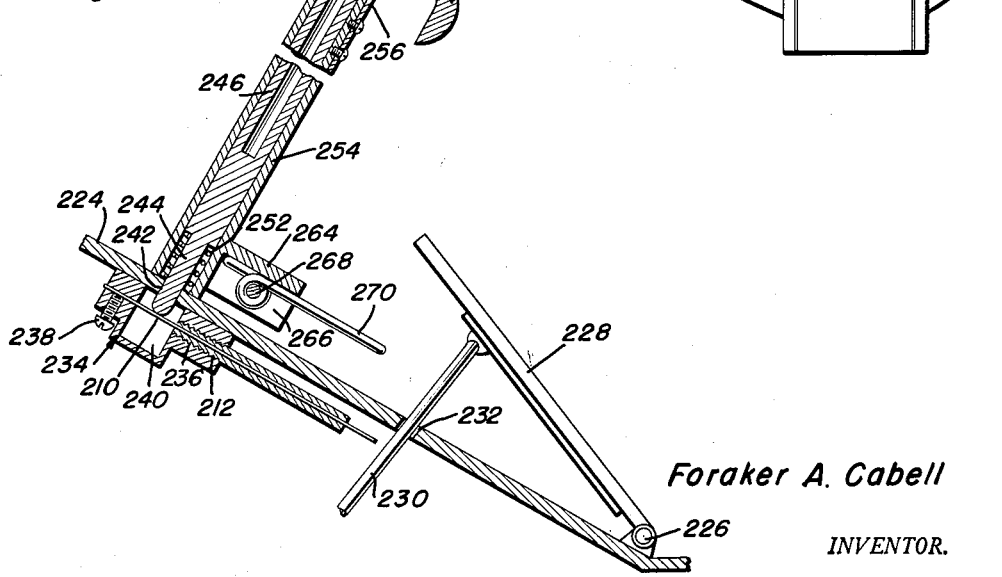
Figure 2 is an enlarged longitudinal vertical sectional view taken through the center of the means for actuating the control mechanism and showing the same in an inoperative position whereby the same cannot be actuated by the accelerator pedal.

Referring now to Figures 1 and 2 in particular, it will be seen that there is illustrated a floor board of a vehicle in which the rear axle case 10 is mounted. The floor board is referred to in general by the reference numeral 224 and has pivotally connected thereto by a connection 226 an accelerator pedal 228. The accelerator pedal 228 has connected thereto a carburetor control rod 230 which passes through an opening 232 in the floor board 224.

Disposed forwardly of the accelerator pedal 228 and secured to the underside of the floor board 224 is a fitting, which is referred to in general by reference numeral 234. The fitting 234 has a rearwardly extending internally threaded bore 236 in which is threadedly engaged the forward end of the housing for the flexible cable 210. The flexible cable 210 extends through the fitting 234 and is clamped therein by a set screw 238 in an end of the fitting 234 opposite from the connection to the housing 212. Extending transversely of the flexible cable 210 and opening upwardly is an enlarged bore 240 through which the flexible cable 210 passes.

The floor board 224 is provided with a bore 242 in alignment with the opening 240 and through which passes a reduced lower end 244 of an actuating rod 246.

Carried by a supporting plate 248 is an upper bearing 250 which is in alignment with the bore 242 and supports the upper end of the control rod 246 and limits the upward movement thereof. It will be noted that the control rod 246 has the reduced lower end thereof in engagement with the flexible cable 210 and is urged upwardly by a coil spring 252, carried by the reduced end portion 244.

Surrounding the control rod 246 is an elongated tubular collar 254 which has connected to the upper end portion thereof a leaf spring 256. The leaf spring has connected to its upper end a finger anchor 258 which is provided with an inwardly extending recess 260. The recess 260 is adapted to receive a projecting portion of a pin 262 carried by the control rod 246 to connect the finger anchor 258 thereto. It will be understood that the finger anchor 258 may be disconnected from the anchor pin 262 by pulling the same rearwardly and away from the control rod 246 and then permitting the same to be lowered.

It will be noted that the collar 254 is provided with a rearwardly projecting flange 264 adjacent the lower end thereof, the flange 264 having downwardly extending side flanges 266 integral therewith. Extending between the side flanges 266 is a connecting pin 268 about which is looped an intermediate portion of a spring arm 270. The spring arm 270 underlies the forward end of the accelerator pedal 228 and is engaged thereby and moves the collar 254 and rod 246 when connected to the control rod 246. Downward movement of the accelerator pedal 228 will result in the downward movement of the spring arm 270 and the resultant movement of the collar 254 and the control rod 246. Downward movement of the control rod 246 results in the bending of the flexible cable 210 with the resultant forward pulling of the rear end thereof so as to move the rod 202 forward from the position illustrated in Figure 4 and actuate the sleeve valve 208 and the T-shaped member 72 whereby the actuating pump assembly 56 is actuated. Accordingly, it will be readily apparent that the control mechanism for the fluid governor is operatively connected to the accelerator pedal 228 for control thereby. While the control rod 246 and the collar 254 have only limited downward movement, it will be noted that the accelerator pedal 224 may be continued to be pressed down even though the downward movement of the collar 254 has been stopped due to the flexing of the spring arm 270.

It will be understood that the pressure regulating valve 130 is so adjusted that for speeds up to 15 miles an hour the pressure of oil pumped by means 64 will be sufficient to urge the pistons 86 inwardly into engagement with the cam 84. However, after the vehicle has obtained a speed greater than 15 miles an hour the centrifugal force urging the pistons 86 outwardly in addition to the force exerted by the springs 100 is greater than the pressure exerted on the pistons by the oil pump by the actuating pump assembly 56 so that the pistons are not urged into engagement with the cam 84 and therefore, the hydraulic differential control mechanism, which is the subject of this invention, is automatically disengaged upon the reaching of a speed in excess of 15 miles per hour by the vehicle. Due to this novel arrangement, it will be seen that, if it is desired, the actuating means for the hydraulic differential control mechanism may be retained in engagement with the accelerator pedal 228 at all times, if it is so desired, providing the operator of the vehicle desires to have the differential action regulated at low speeds. It will be understood that the primary intention of this invention is to provide means for locking the differential action of a vehicle at low speed whereby the same may be controlled on slippery roads, or in the case of country roads, or muddy roads. It will be understood that the speed at which the regulating of the differential action is continued may be varied by adjusting the plug 134 in the valve assembly 106 to adjust the tension of the coil spring 132.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. A fluid governor for controlling differential action of a drive axle differential having a drive pinion shaft and a differential pinion shaft having a fixed differential pinion secured thereto, axle pinions engaged with said differential pinion for rotating said differential pinion shaft and responsive to opposite rotation of said axle pinions, said fluid governor including a first fluid pump driven by said drive pinion shaft, a second fluid pump driven by said differential pinion shaft, pipe means inter-communicating said first and second fluid pumps in opposed relation whereby fluid pumped by said first fluid pump resists actuation of said second fluid pump to provide a braking action on said differential pinion shaft.

2. A fluid governor for controlling differential having a drive pinion shaft and a differential pinion shaft having a fixed differential pinion secured thereto, axle pinions engaged with said differential pinion for rotating said differential pinion shaft and responsive to opposite rotation of said axle pinions, said fluid governor including a first fluid pump driven by said drive pinion shaft, a second fluid pump driven by said differential pinion shaft, pipe means inter-communicating said first and second fluid pumps in opposted relation whereby fluid pumped by said first fluid pump resists actuation of said second fluid pump to provide a braking action on said differential pinion shaft, said second fluid pump including cylinders having pistons reciprocably mounted therein, said cylinders being mounted within a differential gear case for said differential pinions and being partially movable out of said gear case, said cylinders being movable in response to overriding of said braking action to permit said pistons to rotate.

3. A fluid governor for controlling differential action of a drive axle differential having a drive pinion shaft and a differential pinion shaft having a fixed differential pinion secured thereto, axle pinions engaged with said differential pinion for rotating said differential pinion shaft and responsive to opposite rotation of said axle pinions, said fluid governor including a first fluid pump driven by said drive pinion shaft, a second fluid pump driven by said differential pinion shaft, pipe means inter-communicating said first and second fluid pumps in opposed relation whereby fluid pumped by said first fluid pump resists actuation of said second fluid pump to provide a braking action on said differential pinion shaft, said first fluid pump including a cam mounted on said drive pinion shaft, a connecting member carried by a piston of said first pump selectively engageable with said cam for reciprocating said piston.

4. A fluid governor for controlling differential action of a drive axle differential having a drive pinion shaft and a differential pinion shaft having a fixed differential pinion secured thereto, axle pinions engaged with said differential pinion for rotating said differential pinion shaft and responsive to opposite rotation of said axle pinions, said fluid governor including a first fluid pump driven by said drive pinion shaft, a second fluid pump driven by said differential pinion shaft, pipe means inter-communicating said first and second fluid pumps in opposed relation whereby fluid pumped by said first fluid pump resists actuation of said second fluid pump to provide a braking action on said differential pinion shaft, said first fluid pump including a cam mounted on said drive pinion shaft, a connecting member carried by a piston of said first pump selectively engageable with said cam for reciprocating said piston, said connecting member being shiftable by control means selectively operable by an operator of a vehicle so equipped for selectively operating said first fluid pump.

5. A fluid governor for controlling differential action of a drive axle differential having a drive pinion shaft and a differential pinion shaft having a fixed differential pinion secured thereto, axle pinions engaged with said differential pinion for rotating said differential pinion shaft and responsive to opposite rotation of said axle pinions, said fluid governor including a first fluid pump driven by said drive pinion shaft, a second fluid pump driven by said differential pinion shaft, pipe means inter-communicating said first and second fluid pumps in opposed relation whereby fluid pumped by said first fluid pump resists actuation of said second fluid pump to provide a braking action on said differential pinion shaft, said first fluid pump including a cam mounted on said drive pinion shaft, a connecting member carried by a piston of said first pump selectively engageable with said cam for reciprocating said piston, said connecting member being shiftable by control means selectively operable by an operator of a vehicle so equipped for selectively operating said first fluid pump, said control means being provided with a connection to selectively render the same operative.

6. A fluid governor for controlling differential action of a drive axle differential having a drive pinion shaft and a differential pinion shaft having a fixed differential pinion secured thereto, axle pinions engaged with said differential pinion for rotating said differential pinion shaft and responsive to opposite rotation of said axle pinions, said fluid governor including a first fluid pump driven by said driven pinion shaft, a second fluid pump driven by said differential pinion shaft, pipe means inter-communicating said first and second fluid pumps in opposed relation whereby fluid pumped by said first fluid pump resists actuation of said second fluid pump to provide a braking action on said differential pinion shaft, said fluid pumps pumping gear oil used for lubricating drive and differential gears in a drive axle assembly, said gear oil being disposed within a drive axle gear housing.

7. A fluid governor for controlling differential action of a drive axle differential having a drive pinion shaft and a differential pinion shaft having a fixed differential pinion secured thereto, axle pinions engaged with said differential pinion for rotating said differential pinion shaft and responsive to opposite rotation of said axle pinions, said fluid governor including a first fluid pump driven by said drive pinion shaft, a second fluid pump driven by said differential pinion shaft, pipe means inter-communicating said first and second fluid pumps in opposed relation whereby fluid pumped by said first fluid pump resists actuation of said second fluid pump to provide a braking action on said differential pinion shaft, said means being in the form of a fluid line, a fluid intake carried by said fluid line for permitting intake only of fluid from a drive axle gear case.

8. A fluid governor for controlling differential action of a drive axle differential having a drive pinion shaft and a differential pinion shaft having a fixed differential pinion secured thereto, axle pinions engaged with said differential pinion for rotating said differential pinion shaft and responsive to opposite rotation of said axle pinions, said fluid governor including a first fluid pump driven by said drive pinion shaft, a second fluid pump driven by said differential pinion shaft, pipe means inter-communicating said first and second fluid pumps in opposed relation whereby fluid pumped by said first fluid pump resists actuation of said second fluid pump to provide a braking action on said differential pinion shaft, said second fluid pump including pistons driven by a cam mounted on said differential pinion shaft, said pistons being normally urged out of engagement with said cam by spring elements.

9. A fluid governor for controlling differential action of a drive axle differential having a drive pinion shaft and a differential pinion shaft having a fixed differential pinion secured thereto, axle pinions engaged with said differential pinion for rotating said differential pinion shaft and responsive to opposite rotation of said axle pinions, said fluid governor including a first fluid pump driven by said drive pinion shaft, a second fluid pump driven by said differential pinion shaft, pipe means inter-communicating said first and second fluid pumps in opposed relation whereby fluid pumped by said first fluid pump resists actuation of said second fluid pump to provide a braking action on said differential pinion shaft, said second fluid pump including pistons driven by a cam mounted on said differential pinion shaft, said pistons being normally urged out of engagement with said cam by spring elements, fluid inlets for said pistons being connected to said first fluid pump whereby said pistons are urged into engagement with said cam.

10. A fluid governor for controlling differential action of a drive axle differential having a drive pinion shaft and a differential pinion shaft having a fixed differential pinion secured thereto, axle pinions engaged with said differential pinion for rotating said differential pinion shaft and responsive to opposite rotation of said axle pinions, said fluid governor including a first fluid pump driven by said drive pinion shaft, a second fluid pump driven by said differential pinion shaft, pipe means inter-communicating said first and second fluid pumps in opposed relation whereby fluid pumped by said first fluid pump resists actuation of said second fluid pump to provide a braking action on said differential pinion shaft, said second fluid pump including pistons driven by a cam mounted on said differential pinion shaft, said pistons being normally urged out of engagement with said cam by spring elements, fluid inlets for said pistons being connected to said first fluid pump whereby said pistons are urged into engagement with said cam, the force exerted on said pistons by said first fluid pump being less than the combined force of said spring elements plus centrifugal force on said piston at higher axle speeds.

11. A fluid governor for controlling differential action of a drive axle differential having a drive pinion shaft and a differential pinion shaft having a fixed differential pinion secured thereto, axle pinions engaged with said differential pinion for rotating said differential pinion shaft and responsive to opposite rotation of said axle pinions, said fluid governor including a first fluid pump driven by said drive pinion shaft, a second fluid pump driven by said differential pinion shaft, pipe means inter-communicating said first and second fluid pumps in opposed relation whereby fluid pumped by said first fluid pump resists actuation of said second fluid pump to provide a braking action on said differential pinion shaft, said drive axle differential also including a differential carrier and a different bearing cap, said means being in the form of fluid passages formed in said differential bearing cap rigidly connected to said differential carrier in which said drive pinion shaft is mounted.

12. A fluid governor for controlling differential action of a drive axle differential having a drive pinion shaft and a differential pinion shaft having a fixed differential pinion secured thereto, axle pinions engaged with said differential pinion for rotating said differential pinion shaft and responsive to opposite rotation of said axle pinions, said fluid governor including a first fluid pump driven by said drive pinion shaft, a second fluid pump driven by said differential pinion shaft, pipe means inter-communicating said first and second fluid pumps in opposed relation whereby fluid pumped by said first fluid pump resists actuation of said second fluid pump to provide a braking action on said differential pinion shaft, said drive axle differential also including a differential carrier and a differential bearing cap, said means being in the form of fluid passages formed in said differential bearing cap rigidly connected to said differential carrier in which said drive pinion shaft is mounted, said fluid passages including an air dome for stabilizing fluid pressure within said fluid passages.

13. A fluid governor for controlling differential action of a drive axle differential having a drive pinion shaft and a differential pinion shaft having a fixed differential pinion secured thereto, axle pinions engaged with said differential pinion for rotating said differential pinion shaft and responsive to opposite rotation of said axle pinions, said fluid governor including a first fluid pump driven by said drive pinion shaft, a second fluid pump driven by said differential pinion shaft, pipe means inter-communicating said first and second fluid pumps in opposed relation whereby fluid pumped by said first fluid pump resists actuation of said second fluid pump to provide a braking action on said differential pinion shaft, said second fluid pump including a pair of opposed cylinders connected by a circular central portion, said central portion being formed of spring metal whereby said cylinders may move apart when movement of pistons in said cylinders is restrained.

14. The fluid governor of claim 1 wherein said first pump is provided with control means for selectively engaging said first pump with said drive pinion shaft, said control means being operatively connected to an accelerator pedal of an associated vehicle.

15. The fluid governor of claim 1 wherein said first pump is provided with control means for selectively engaging said first pump with said drive pinion shaft, said control means being operatively connected to an accelerator pedal of an associated vehicle, said control means being provided with a connection to selectively render the same inoperative.

16. The fluid governor of claim 1 wherein said first pump is provided with control means for selectively engaging said first pump with said drive pinion shaft, said control means being operatively connected to an accelerator pedal of an associated vehicle, said first pump having an inlet valve, said control means actuating said inlet valve when operated.

References Cited in the file of this patent
UNITED STATES PATENTS

| Number | Name | Date |
|---|---|---|
| 1,178,093 | Moon | Apr. 4, 1916 |
| 1,374,603 | Patten | Apr. 12, 1921 |
| 1,479,752 | Smith | Jan. 1, 1924 |
| 1,646,020 | Fottinger | Oct. 18, 1927 |
| 1,659,833 | Norrlin | Feb. 21, 1928 |
| 1,683,938 | Wildhaber | Sept. 11, 1928 |
| 1,918,025 | Frankford | July 11, 1932 |
| 1,919,930 | Cash | July 25, 1933 |
| 2,004,929 | Centervall | June 18, 1935 |
| 2,312,274 | Stortz | Feb. 23, 1943 |
| 2,375,938 | Moon | May 15, 1945 |
| 2,452,981 | Benning | Nov. 2, 1948 |
| 2,532,757 | Butterworth | Dec. 5, 1950 |